Sept. 16, 1958     D. WEBER ET AL     2,852,064
CONDUIT BENDING DEVICE
Filed July 31, 1956
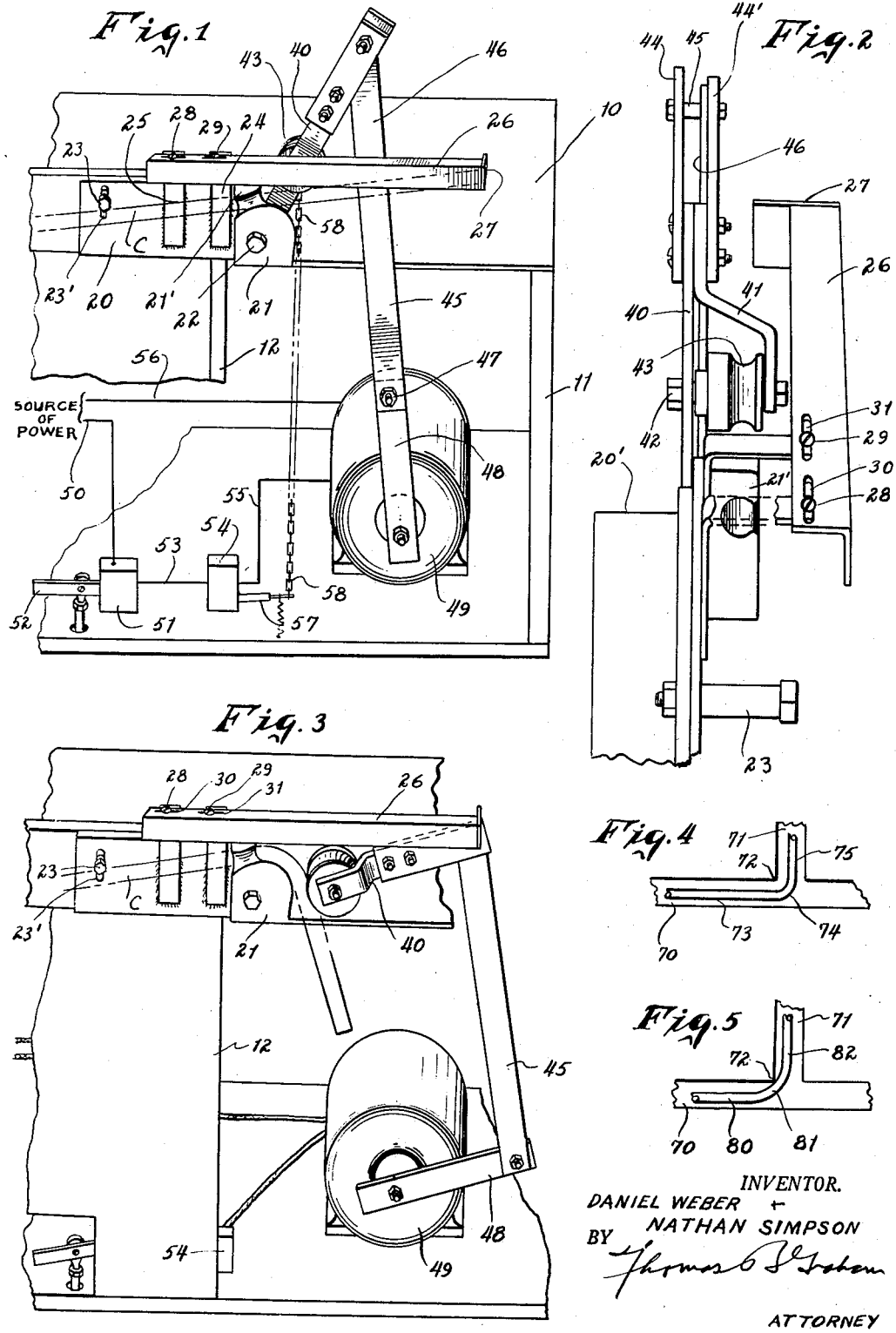
INVENTOR.
DANIEL WEBER +
BY    NATHAN SIMPSON
ATTORNEY United States Patent Office 2,852,064
Patented Sept. 16, 1958

2,852,064

CONDUIT BENDING DEVICE

Daniel Weber, Fort Lee, N. J., and Nathan Simpson, New York, N. Y., assignors to Simpson Electric Corporation, New York, N. Y., a corporation of New York Application July 31, 1956, Serial No. 601,238

1 Claim. (Cl. 153—46)

This invention relates to an apparatus for use in forming conduit in accurately determinable bends of short radius with accurate amounts of standoff from the said bends.

In the construction business particularly, it is common to have electric wires encased in rigid conduit so that the wires themselves are protected. The laying of the conduit usually takes place when a building has been "roughed in," that is, substantially earlier than the time of plastering or laying of finished floors or ceilings. It is the duty of the electrical contractor, therefore, to lay his conduit accurately along poured concrete floors, for example, and to have the conduit standoffs from the floors and ceilings an accurately predetermined amount so that the outlet boxes which are carried at the standoff ends will be at the proper levels. In the placing of conduit in a ceiling, the conduit must be carried and standoff brought to a junction box which will be substantially flush with the ceiling so that the proper fixture can be attached thereto. The course of the conduit between the standoff points being embedded in concrete floor or enclosed in other structural work usually is not important and adjustments of lengths between the outlets is usually brought about by means of a coupling. It is the standoff from the elbow or bend on which the outlet box is to be carried which must be accurately placed to take its proper position in relation to the finished surface which is ultimately to be prepared, whether that finished surface be a floor, a wall, or a ceiling. Also, since a typical floor may be only four inches thick, conduit embedded in it must have elbows of short radius in order to place the standoff in the center of a two inch partition without having the inside of said bend protrude through the deck at the partition. In setting outlets in ceilings, the short radius is also of great importance.

In the construction of an apartment house for example, where there will be many individual apartments the number of outlets will be many times the number of apartments and, accordingly, the number of bends which must be made in electrical conduit so as to place junction boxes and outlets accurately in relation to floors, walls and ceilings is very large. It is conventional practice to use a hand bender for the purpose of fabricating the tubes on the spot, the tube bender being characterized by its having a long handle in association with a fulcrum and a die carrying a groove matching the size of the conduit, so that the bend can be made around the die without materially altering the cross section of the tube at the bend. The disadvantage of the hand bender is that it requires heavy manual labor and a skilled operator, powerfully built, may be capable of making about 300 bends in one day. The second disadvantage of the hand operation is, of course, the placement of the standoff is virtually uncontrollable and frequently adjustments must be made on the site to obtain accurate placement of the outlet and junction boxes.

It is, accordingly, a basic object of this invention to provide a tool suitable for use in the fabrication of electrical conduit bends having accurately controlled amounts of standoff as well as accurate short radius bends and to provide power means for driving the said tool.

It is another object of the invention to provide a power tool capable of forming large numbers of angular bends of short radius in electrical conduit rapidly and efficiently with a high degree of accuracy, both in the angle of the bend and in the amount of standoff from the bend.

Other objects and advantages of the invention will in part be obvious and in part appear hereinafter.

The invention is embodied in a machine suitable for bending conduit into appropriate angular shapes with accurately controlled amounts of standoff from the bend, the machine being characterized by the combination of a pivot, a die in fixed spaced relation to the pivot, a gauge in fixed spaced relation to the pivot, and a bending means having a locus of movement in relation to the die which is an arc of an angle substantially supplementary to the angle of bend to be produced in the conduit, the combination being further characterized by means for the application of power to the bending means with an electrical control, such that a single operative cycle commencing from the application of power to the completion of a bend brings the machine back to a starting position.

The construction and operation of the machine will be better understood by referring to the accompanying drawings wherein:

Fig. 1 is a general front elevation of the machine;

Fig. 2 is a plan view of the pivot, the die and the gauge together with the bending roller;

Fig. 3 is a front elevation illustrating the placement of a section of electric conduit in the die and the position of the roller about midway through the bending stroke;

Figs. 4 and 5 illustrate the relationship of the radius of the bend to the deck and partition in which it is to be set.

Referring now to Fig. 1, 10 represents a work bench or table top supported by uprights 11, 12, etc. Mounted on the work bench surface itself and arranged at a convenient height is the plate 20, which may be the vertical part of an L structural section of steel; the horizontal portion 20' is fastened to the bench top. Fastened to plate 20, is die 21 which has a short radius of curvature centering on pivot 22. Die 21 also has an upper connecting lip 21' to help retain conduit in the groove of die 21 during a bend. Fixed point 23, which is a standoff lever or bolt, is vertically adjustable in its slot 23' so that a section of straight conduit C will extend from it into the die 21 under the lip 21'.

Mounted in fixed relation to the pivot 22 are the brackets or supports 24 and 25 which carry gauge 26 so that end stop 27 is held in fixed relation to the pivot 22. For adjusting the linear measure of the gauge, provision is made in the form of set screws 28 and 29 on the supports 24 and 25 to permit lateral adjustment of the gauge. The gauge itself is provided with elongated holes 30 and 31 to permit the lateral adjustment.

The bending arm 40 is pivoted at pivot point 22 and is bifurcated to carry side arm 41. Shaft 42 carries the bending roller 43. In the embodiment shown in Figs. 1–2, the bending arm 40 also carries the bifurcated extension 44—44', which carries shaft 45 on which is pivoted the link 46. To move the bending arm 40 and its roller 43 through an arc suitable for making the desired bend, link 46 is pivoted at 47 to the crank arm 48 which is driven by the motor or power drive 49.

Referring now to Fig. 2, the details of the structural and spatial arrangement of parts may be seen wherein the aligning of the bending roller 43 with the radial die 21 is shown. The purpose of the groove in the die is principally to have its radius so matched to the size of conduit to be bent that in the process of bending the conduit it does not flatten out in the region of the bend. In the preparation of short radius bends, this is important because the short radius if accompanied by substantial reduction in diameter of the conduit at the bend can seriously interfere with the passage of wires. The usual conduit size is ½" or ¾".

The spatial arrangement of the gauge 24 and the pivot 22 is apparent from the geometric relationship shown in Fig. 1, where it is apparent that the distance from the pivot point 22 horizontally to the point 27 is a measure of the amount of vertical standoff desired when a right angle bend is made in the machine. That is the straight conduit C laid in the die from the point 21 outward follows the locus of a tangent to the arc of the die around which the bend is formed. When the bending arm 40 is taken through its cycle of a full arc around pivot point 22 the 90° bend is formed.

In Fig. 1 the electrical circuit has been indicated. Briefly, it consists of a connection from a power source through conduit 50 to the starting switch 51, which is preferably a foot switch having foot lever 52; the starting switch 51 is in turn connected by conduit 53 in series with limit switch 54. This feeds to conduit 55, to motor 49 and thence through conduit 56 to the source. Mechanical linkage of limit switch 54 through arm 57 and chain 58 to bending arm 40 controls the power application cycle. That is, foot switch 51 starts the motion and when arm 40 has completed a bending cycle, limit switch 54 interrupts the power.

Referring now to Fig. 1 and Fig. 3 it will be seen in Fig. 1 that the bending arm 40 is in a starting, or substantially its uppermost position. A section of conduit C is inserted at this time to fit into die 21, under lip 21′, contacting stop 23, and extending to point 27. For accurate rapid alignment it will be apparent that stop 23, and lip 21′ level the conduit in place and gauge 24 with end stop 27 measures of the amount of standoff needed. The length of conduit from pivot point 21 to 27 will determine the level to which the vertical standoff point will come.

In Fig. 3 the machine is shown as the bending arm substantially completes a cycle of motion to form a right angle bend. The remainder of the cycle of movement of the bending arm is to complete the arc and bend conduit C around the die 21, whereupon it is returned to the position shown in Fig. 1 by completion of a revolution of motor 49.

Figures 4 and 5 illustrate diagrammatically the difference between the short radius bend and the long radius bend. In Figure 4, a four inch concrete deck 70 meets partition 71 at line 72. Conduit 73, with short radius bend 74 permits easy centering of standoff 75 in the partition, while keeping the conduit easily clear of joint 72. Short radii of 2½ to 3″ are rapidly and accurately reproducible in the machine. Typical hand bends give radii of about 5″.

In Fig. 5 conduit 80, when laid in the same floor, having long radius bend 81 to give standoff 82 centered in the partition, will cause the bend to show at line 72.

This condition is consistently and easily avoided through use of our machine to fabricate the short radius bends, i. e., bends of about 2½–3″ radius.

For right angle bends of conduit a substantially right angle arc of travel for the bending roller is indicated. For bends less than right angle the degree of bend is the difference between the angle desired in the conduit and 180°.

That is, it will be seen that in the formation of a right angle bend, placement of the conduit as shown in Fig. 1 with the aid of the gauge 27 will determine the length of standoff. This is followed by activation of the machine to put it through one cycle whereby it quickly forms a right angle bend of short radius. The bend can be reproduced accurately with the desired predetermined standoff practically as rapidly as an operator will place the sections of conduit in the machine. It has been found possible utilizing a machine of the design shown to fabricate as many as 200 bends per hour, all of them having the standoffs accurately matched so that no adjustment on the site has been necessary. The horizontals are merely laid in place and the vertical sections stand off to the prescribed desired height. Horizontals are then connected to feeders and the verticals to the appropriate outlet boxes.

Although the invention has been described in conjunction with only a single specific embodiment, variations thereof may be made without departing from its spirit or scope.

What is claimed is:

An apparatus for forming a hollow electrical conduit for house wiring into right angle bends around a single relatively short radius in a single stroke while maintaining substantially circular the internal diameter of said conduit around said bend so that electrical wires may be easily passed around said bend, comprising in combination: a frame; a conduit restraining means on said frame; a fixed die defining substantially the right angle bend to be made and mounted on said frame in substantially horizontal alignment with said restraining means and in the same vertical plane, the curvature of said bend being centered at a fixed pivot point on the body of said die, and said die having a concave peripheral face circumferentially curved so as to conform substantially to the bend to be made in said conduit, the transverse curvature of said die face being semicircular and matching the outer circumference of the conduit to be bent so that while said conduit is in the said die lateral distortion of the conduit around the right angle bend is minimized; means integral with said die and having a lip portion overlying the peripheral face of said die to aid in guiding a straight length of conduit into said die and retain said conduit therein while it is being bent, said lip portion being positioned above the pivot point of said die in substantially horizontal alignment with said restraining means; an arm pivoted at the said pivot point on the die, said arm carrying a bifurcation; a forming roller carried by said arm in said bifurcation for movement in the plane of the die and spaced from the said pivot point to contact said conduit and form it around said peripheral face of said die, said roller having a concave peripheral face, the transverse curvature of which is substantially semi-circular so that it matches the curvature of said die to define an essentially circular outline between said roller and said die for the confining of said conduit as it is bent; rotary power means vertically spaced from said pivot point on said die and lying in the same vertical plane as said restraining means and said pivot point and horizontally offset therefrom; a crank arm rigidly secured to said rotary power means to revolve therewith; a link pivotally secured to the free ends of said first arm and said crank arm, said two arms and said link being laterally spaced from but adjacent the vertical plane containing said die, said roller and said conduit restraining means, and arranged and dimensioned so that one complete revolution of said rotary power means rocks said forming roller from an initial position wherein a straight length of conduit engages said restraining means and extends between said roller and die to a position in which a right-angle bend has been formed therein and back to said initial position; manual means to initiate movement of said rotary power means; means operated by said first arm to terminate movement of said rotary power means after one complete revolution thereof; and a stop gauge mounted on said frame in fixed spaced relation to said pivot point and aligned with the plane of said die and said restraining means so as to be engaged by the end of a straight length of conduit guided into said die to determine the free length of conduit to be bent around said die and provide a desired amount of standoff from the bend.

References Cited in the file of this patent

UNITED STATES PATENTS

| | | |
|---|---|---|
| 280,862 | Reach | July 10, 1883 |
| 1,217,488 | Myers | Feb. 27, 1917 |
| 1,816,218 | Henry et al. | July 28, 1931 |
| 2,306,224 | Parker et al. | Dec. 22, 1942 |
| 2,349,525 | St. Clair | May 23, 1944 |